US011403736B2

(12) United States Patent
Echizenya et al.

(10) Patent No.: US 11,403,736 B2
(45) Date of Patent: Aug. 2, 2022

(54) IMAGE PROCESSING APPARATUS TO REDUCE NOISE IN AN IMAGE

(71) Applicant: CANON KABUSHIKI KAISHA, Tokyo (JP)

(72) Inventors: Yohsuke Echizenya, Inagi (JP); Masaaki Kobayashi, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 16/052,504

(22) Filed: Aug. 1, 2018

(65) Prior Publication Data
US 2019/0066269 A1  Feb. 28, 2019

(30) Foreign Application Priority Data
Aug. 30, 2017  (JP) .............................. JP2017-166097

(51) Int. Cl.
*G06K 9/00* (2022.01)
*G06T 5/00* (2006.01)
*G06V 10/30* (2022.01)
*G06V 10/44* (2022.01)
*G06V 10/75* (2022.01)

(52) U.S. Cl.
CPC .............. *G06T 5/002* (2013.01); *G06T 5/003* (2013.01); *G06V 10/30* (2022.01); *G06V 10/44* (2022.01); *G06V 10/751* (2022.01); *G06T 2207/20012* (2013.01); *G06T 2207/20192* (2013.01)

(58) Field of Classification Search
CPC ..................... G06T 5/002; G06T 5/003; G06T 2207/20192; G06T 2207/20012; G06K 9/40; G06K 9/4604; G06K 9/6202; G06V 10/30; G06V 10/44; G06V 10/751

USPC .................................................. 382/254–275
See application file for complete search history.

(56) References Cited

U.S. PATENT DOCUMENTS

| | | | | |
|---|---|---|---|---|
| 6,563,537 B1 * | 5/2003 | Kawamura | ........ | H04N 9/04557 348/252 |
| 7,127,121 B1 * | 10/2006 | Pan | .......................... | G06T 5/002 382/260 |
| 2006/0262989 A1 * | 11/2006 | Tegenbosch | ............ | G06T 5/003 382/261 |

(Continued)

FOREIGN PATENT DOCUMENTS

| | | |
|---|---|---|
| JP | 2006-014024 A | 1/2006 |
| JP | 2006-023981 A | 1/2006 |
| JP | 2014-166010 A | 9/2014 |

*Primary Examiner* — Andrew M Moyer
(74) *Attorney, Agent, or Firm* — Canon U.S.A., Inc. I.P. Division

(57) ABSTRACT

An image processing apparatus to execute a noise reduction process on an image includes setting and calculation units. The setting unit sets a parameter for a pixel of interest in the image. The calculation unit calculates a pixel value of the pixel of interest by using the parameter. Where the pixel of interest is not a pixel in a corner portion where two different edges intersect, the calculation unit averages a plurality of pixels, thereby calculating the pixel value of the pixel of interest subjected to the noise reduction process. Where the pixel of interest is a pixel included in the corner portion, the averaging is not executed and the pixel value of the pixel of interest is calculating by treating the pixel value of the pixel of interest as it is as the pixel value of the pixel of interest subjected to the noise reduction process.

15 Claims, 10 Drawing Sheets

(56) References Cited

U.S. PATENT DOCUMENTS

| | | | | |
|---|---|---|---|---|
| 2007/0116373 A1* | 5/2007 | Hwang | ............... | G06T 5/002 |
| | | | | 382/261 |
| 2008/0273119 A1* | 11/2008 | Yang | .............. | H04N 5/21 |
| | | | | 348/575 |
| 2010/0060749 A1* | 3/2010 | Srinivasan | ............ | H04N 19/86 |
| | | | | 348/222.1 |
| 2011/0069904 A1* | 3/2011 | Yang | .............. | G06T 5/002 |
| | | | | 382/275 |
| 2012/0294526 A1* | 11/2012 | Yasan | ............. | G06K 9/40 |
| | | | | 382/167 |
| 2013/0121606 A1* | 5/2013 | Chien | ............. | G06T 5/005 |
| | | | | 382/260 |
| 2015/0142394 A1* | 5/2015 | Mehr | .............. | G06T 7/75 |
| | | | | 703/1 |
| 2016/0253830 A1* | 9/2016 | Yuan | .............. | G06T 5/002 |
| | | | | 382/279 |
| 2019/0268597 A1* | 8/2019 | Nagumo | ............ | H04N 19/126 |

* cited by examiner

IMAGE PROCESSING APPARATUS TO REDUCE NOISE IN AN IMAGE

BACKGROUND OF THE INVENTION

Field of the Invention

The present disclosure relates to a technique for reducing noise in an image.

Description of the Related Art

As a technique for reducing noise included in an image, a method for reducing noise without impairing the sharpness of an image such as an edge is conventionally known. The publication of Japanese Patent Application Laid-Open No. 2006-14024 discusses a method for performing a smoothing process on, among pixels in a predetermined range, only a pixel where the difference between the signal value of the pixel and the signal value of a pixel of interest is less than or equal to a threshold.

According to the method discussed in Japanese Patent Application Laid-Open No. 2006-14024, in the case of an edge having low contrast, the difference between pixel values is less than or equal to the threshold. Thus, the pixels may be averaged, and an edge part may blur. If, on the other hand, the threshold, which is to be compared with the difference is set small in order to detect pixels averaged with high accuracy relative to an edge having low contrast, the number of pixels to be used for the averaging with respect to all pixels becomes small, and a noise reduction effect is reduced.

SUMMARY OF THE INVENTION

The present disclosure is directed to appropriately executing a noise reduction process also on an edge in an image.

According to an aspect of the present invention, an image processing apparatus to execute a noise reduction process on an image includes a setting unit configured to set a parameter for a pixel of interest in the image, and a calculation unit configured to calculate a pixel value of the pixel of interest subjected to the noise reduction process by using the parameter, wherein, in a case where the pixel of interest is not a pixel in a corner portion where two different edges intersect, the calculation unit averages a plurality of pixels, thereby calculating the pixel value of the pixel of interest subjected to the noise reduction process, and wherein, in a case where the pixel of interest is a pixel included in the corner portion, the calculation unit does not execute the averaging and calculates the pixel value of the pixel of interest by treating the pixel value of the pixel of interest in the image as it is as the pixel value of the pixel of interest subjected to the noise reduction process.

Further features of the present invention will become apparent from the following description of embodiments with reference to the attached drawings.

DESCRIPTION OF THE EMBODIMENTS

With reference to the attached drawings, the present disclosure will be described in detail below based on its suitable embodiments. The configurations illustrated in the following embodiments are merely illustrative, and the present disclosure is not necessarily limited to the illustrated configurations.

A first embodiment is described using as an example an image processing apparatus. The image processing apparatus is configured to detect feature points in a plurality of images obtained by continuously capturing an object, detect feature points corresponding to each other between the plurality of images, and calculate the motion of the entirety of the images. Before detecting the feature points in the images, the image processing apparatus executes a noise reduction process on each of the plurality of images. As each feature point, a corner where two line segments intersect (hereinafter referred to as a "corner") is used. Thus, if the corner blurs due to the noise reduction process, the feature point cannot be detected with high accuracy. In the first embodiment, a description is given of a noise reduction process, which preserves sharpness of the corner.

Figure 1:
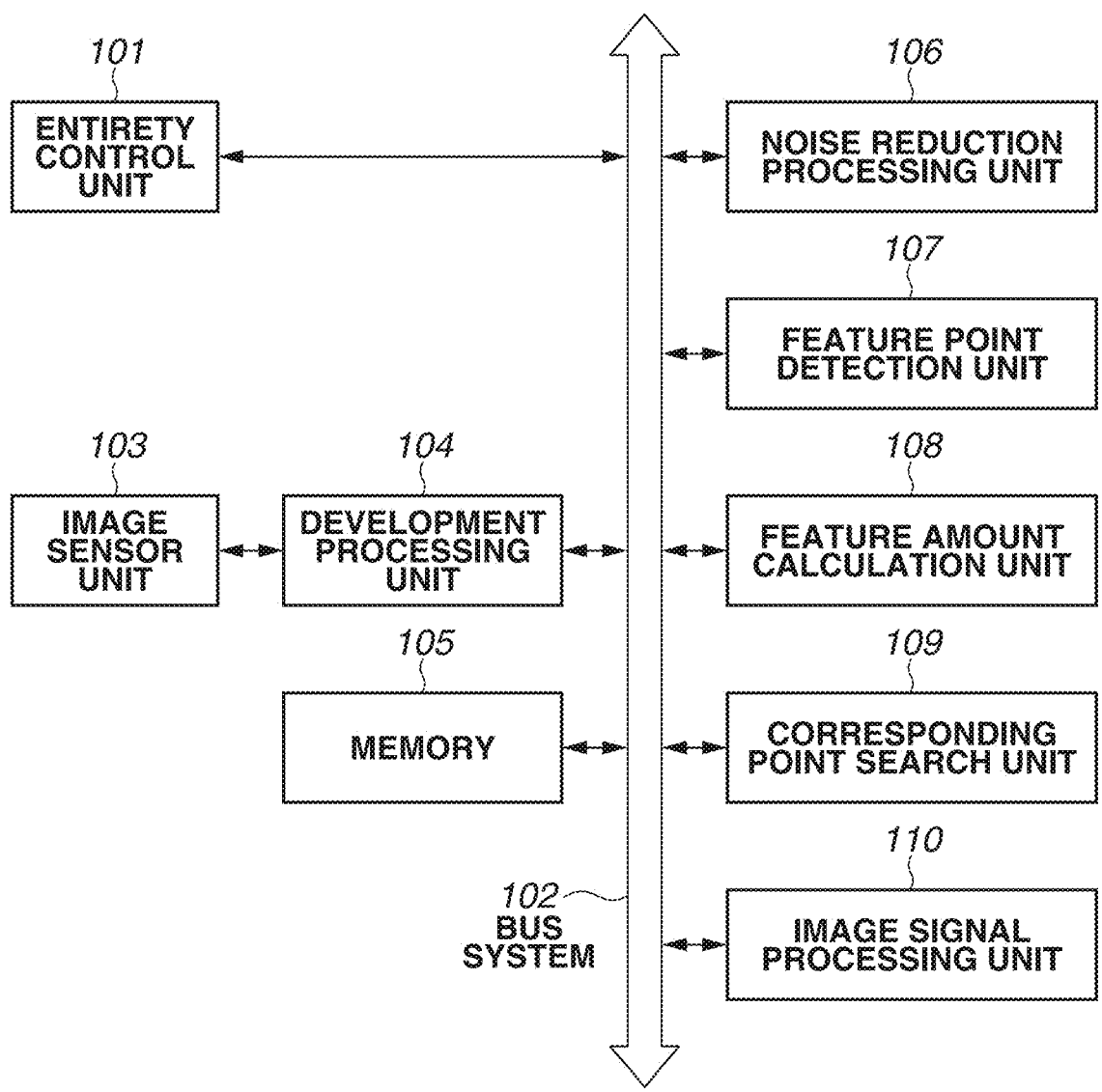
FIG. 1 is a block diagram of an image processing apparatus.

FIG. 1 is a block diagram illustrating the image processing apparatus according to the first embodiment. An image processing apparatus 100 includes an entirety control unit 101, a bus system 102, an image sensor unit 103, a development processing unit 104, a memory 105, a noise reduction processing unit 106, a feature point detection unit 107, a feature amount calculation unit 108, a corresponding point search unit 109, and an image signal processing unit 110.

The entirety control unit 101 is a device such as a general-purpose central processing unit (CPU) having the function of controlling via the bus system 102 the processing order of processing units from the image sensor unit 103 to the image signal processing unit 110, and the transmission and reception of data. The bus system 102 is connected to the components and the memory 105, mediates a data transfer request from each processing unit, and transfers data between the components.

The image sensor unit 103 includes a two-dimensional sensor composed of a plurality of light-receiving elements. In the image sensor unit 103, an electric charge is accumulated receiving incident light entering the sensor through an optical system (not illustrated). The image sensor unit 103 reads the accumulated electric charge to convert the incident light into a digital electric signal, and outputs the digital electric signal. The development processing unit 104 performs signal processing on the digital electric signal received from the image sensor unit 103, converts the resulting signal into image data in a predetermined format such as a red, green, and blue (RGB) format or a YUV format, and outputs the image data.

The memory 105 is a storage device such as a dynamic random-access memory (DRAM) for temporarily storing data to be processed by each component, such as image data and feature point data. Further, the memory 105 is also used to store a program to be used by the entirety control unit 101. Each processing unit may separately include a data storage unit (not illustrated) other than the memory 105.

The noise reduction processing unit 106 executes a noise reduction process on the image data output from the development processing unit 104. The details of the noise reduction processing unit 106 will be described below. The feature point detection unit 107 detects a feature point in the image data subjected to the noise reduction process and output from the noise reduction processing unit 106. The feature point detection unit 107 outputs data obtained by combining the coordinates of the feature point and accompanying information. The feature amount calculation unit 108 calculates feature amount data indicating the feature amount of the feature point, from surrounding pixel data of the coordinates of the feature point and outputs the calculated feature amount data.

Based on feature amount data of each feature point in temporally continuously captured image data, the corresponding point search unit 109 searches for corresponding feature points (corresponding points) among the pieces of continuously captured image data. Based on the corresponding points found by the corresponding point search unit 109, the image signal processing unit 110 performs positioning of the continuously captured image data, or combines the continuously captured image data.

Figure 2:
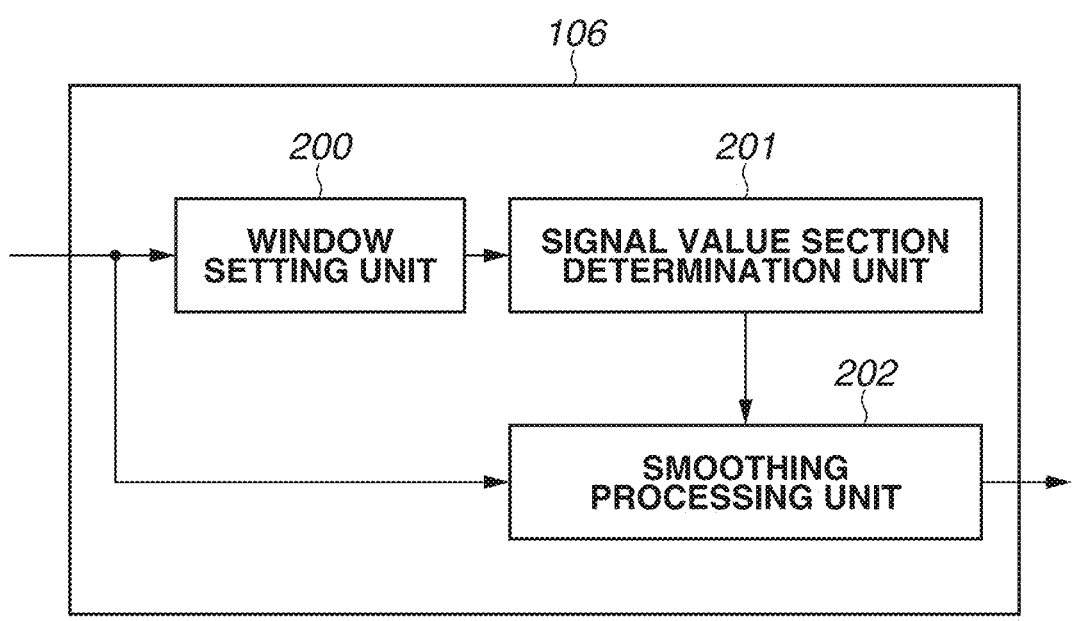
FIG. 2 is a block diagram illustrating a configuration of a noise reduction processing unit.

Next, the details of the noise reduction processing unit 106 are described. FIG. 2 is a block diagram illustrating the detailed configuration of the noise reduction processing unit 106. The noise reduction processing unit 106 includes a window setting unit 200, a signal value section determination unit 201, and a smoothing processing unit 202.

To determine whether to execute a smoothing process on a pixel of interest, the window setting unit 200 sets as windows a first area and a second area defined in two different directions. In this case, the window setting unit 200 sets, as the windows, three pixels in a vertical direction including upper and lower pixels with the pixel of interest at the center, and three pixels in a horizontal direction including left and right pixels with the pixel of interest at the center. Using the signal values of the pixels in the windows, the signal value section determination unit 201 determines a signal value section where the pixel of interest is to be smoothed.

Using a window wider than the windows set by the window setting unit 200, the smoothing processing unit 202 executes the smoothing process. In the present case, the smoothing processing unit 202 sets a window including 5 pixels×5 pixels with the pixel of interest at the center, calculates the average of the pixel values of the pixels included in the window, and outputs the calculated average as the pixel value of the pixel of interest subjected to the noise reduction process. The smoothing processing unit 202, however, refers to the signal value section determined by the signal value section determination unit 201, and if the pixel value of the pixel of interest is outside the determined signal value section, the smoothing processing unit 202 does not perform the smoothing process.

The details of blocks of the noise reduction processing unit 106 are described. FIG. 3 illustrates the pixel of interest as a target of the noise reduction process and an area near the pixel of interest. In the present embodiment, the smoothing processing unit 202 sets a window 302, which includes 5 pixels×5 pixels, for the pixel of interest. The window setting unit 200 sets a first area 300, which includes upper and lower pixels, and a second area 301, which includes left and right pixels, as the windows for determining the signal value section. The first area 300 and the second area 301 are pixel groups defined in different directions from each other. In this case, the first area 300 and the second area 301 are orthogonal to each other.

Figure 4:
FIG. 4 is a diagram illustrating the pixel of interest as a target of a noise reduction process and an area near the pixel of interest.

In the following description, as illustrated in FIG. 4, (x, y) is used as coordinates representing the position of the pixel of interest, and I(x, y) is used as a sign representing the pixel value of the pixel position (x, y).

Figure 5:
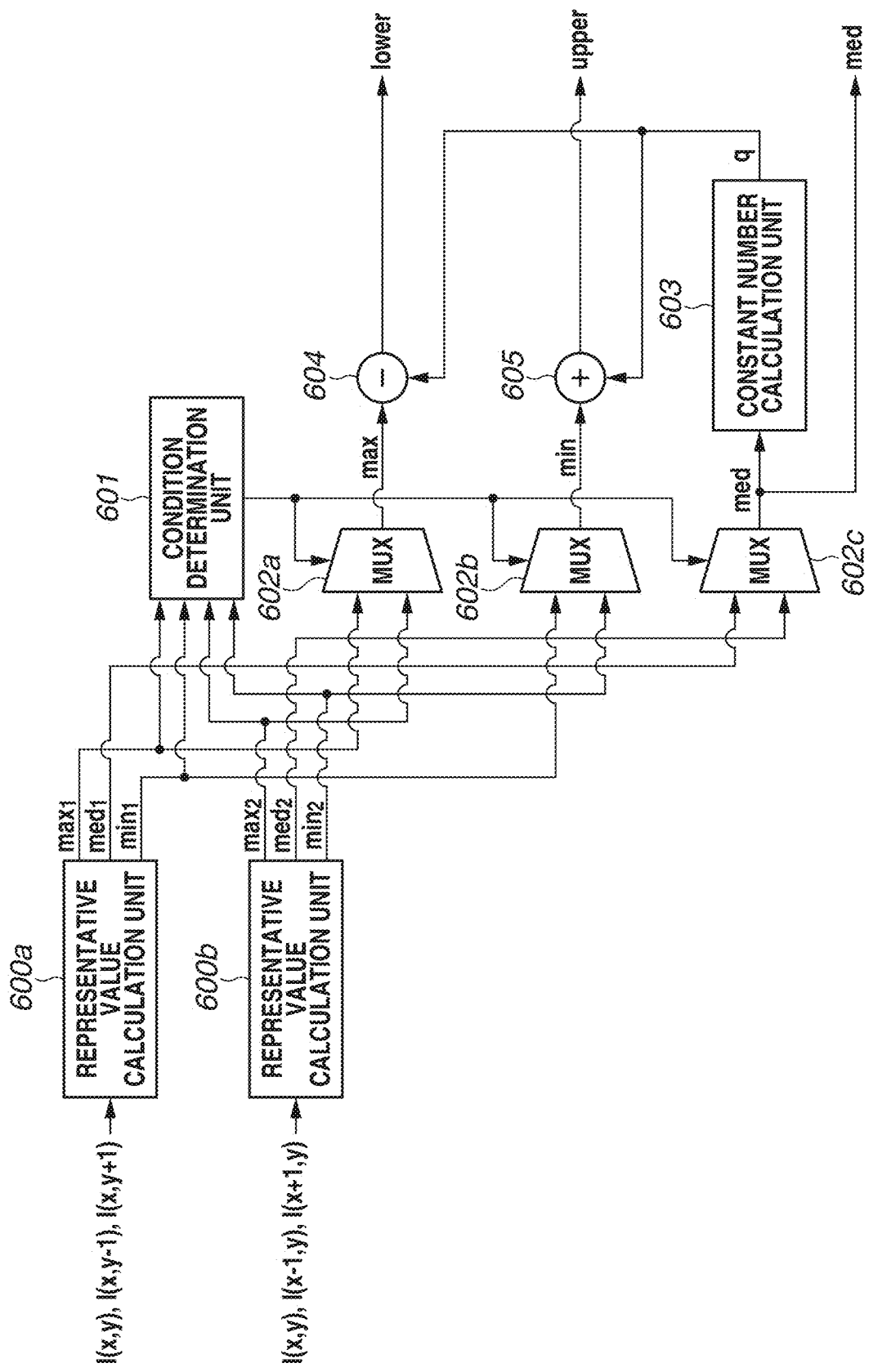
FIG. 5 is a block diagram illustrating an internal configuration of a signal value section determination unit according to a first embodiment.

FIG. 5 is a block diagram illustrating the internal configuration of the signal value section determination unit 201. The signal value section determination unit 201 includes representative value calculation units 600a and 600b, a condition determination unit 601, multiplexers 602a to 602c, a constant number calculation unit 603, a subtraction unit 604, and an addition unit 605. The signal value section determination unit 201 determines the signal value section for determining whether to execute the smoothing process on the pixel of interest.

Values I(x, y), I(x, y−1), and I(x, y+1) of the pixels included in the first area 300 are input into the representative value calculation unit 600a. The representative value calculation unit 600a outputs the greatest value among the pixel values I(x, y), I(x, y−1), and I(x, y+1) as a maximum value max1. Further, the representative value calculation unit 600a outputs the smallest value among the pixel values I(x, y), I(x, y−1), and I(x, y+1) as a minimum value min1. Further, the representative value calculation unit 600a calculates the median of the three pixel values I(x, y), I(x, y−1), and I(x, y+1) and outputs the calculated median as a median value med1. That is, the representative value calculation unit 600a calculates the maximum value max1, the minimum value min1, and the median value med1 as representative values.

Values I(x, y), I(x−1, y), and I(x+1, y) of the pixels included in the second area 301 are input into the representative value calculation unit 600b. Then, the representative value calculation unit 600b calculates a maximum value max2, a minimum value min2, and a median value med2 as representative values similarly to the representative value calculation unit 600a.

The maximum value max1 and the minimum value min1 calculated by the representative value calculation unit 600a and the maximum value max2 and the minimum value min2 calculated by the representative value calculation unit 600b are input into the condition determination unit 601. The condition determination unit 601 compares the difference between the maximum value max1 and the minimum value min1 with the difference between the maximum value max2 and the minimum value min2, thereby determining a condition. The condition determination unit 601 outputs control signals to the multiplexers 602a to 602c so that the representative value is selected that is the difference between the maximum value max1 and the minimum value min1 or the difference between the maximum value max2 and the minimum value min2, whichever is smaller.

Based on the control signals from the condition determination unit 601, the multiplexers 602a to 602c select and output the maximum value max1, the minimum value min1, and the median value med1 or the maximum value max2, the minimum value min2, and the median value med2. The multiplexers 602a, 602b, and 602c output a maximum value max, a minimum value min, and a median value med, respectively.

The median value med output from the multiplexer 602c is input into the constant number calculation unit 603. Then, the constant number calculation unit 603 outputs a constant q. In the present case, the constant number calculation unit 603 outputs the median value med as it is as the constant q.

The subtraction unit 604 outputs a value obtained by subtracting the constant q calculated by the constant number calculation unit 603 from the maximum value max output from the multiplexer 602a, as a lower limit lower of the signal value section. The addition unit 605 calculates an upper limit upper of the signal value section by adding the constant q calculated by the constant number calculation unit 603 to the minimum value min output from the multiplexer 602b. Thus, the signal value section determination unit 201 determines the lower limit lower and the upper limit upper based on the minimum value min and the maximum value max in the pixel groups near the pixel of interest and outputs the lower limit lower and the upper limit upper together with the median value med output from the multiplexer 602c, to the smoothing processing unit 202.

Next, the details of the smoothing process performed by the smoothing processing unit 202 are described. The smoothing processing unit 202 performs the smoothing process using a pixel group included in the window 302, which is wider than the first area 300 and the second area 301 set by the window setting unit 200. The smoothing processing unit 202 makes a calculation represented by formula (1) with a non-linear function f(v). The non-linear function f(v) is represented by formula (2), using the lower limit lower and the upper limit upper input from the signal value section determination unit 201.

$$O(x, y) = \begin{cases} \dfrac{\Sigma_i \Sigma_j I\begin{pmatrix} x+i, \\ y+j \end{pmatrix} f(I(x+i, y+j))}{\Sigma_i \Sigma_j f(I(x+i, y+j))}, & \Sigma_i \Sigma_j f(I(x+i, y+j)) > 0 \\ c, & \Sigma_i \Sigma_j f(I(x+i, y+j)) = 0 \end{cases} \quad \text{formula (1)}$$

$$f(v) = \begin{cases} 1: & \text{lower} \leq v \text{ and } v \leq \text{upper} \\ 0: & \text{otherwise} \end{cases} \quad \text{formula (2)}$$

If a pixel value is in the range of signal values determined by the lower limit lower and the upper limit upper, the non-linear function f(v) outputs one as a result. In other cases, the non-linear function f(v) outputs zero as a result. That is, the pixel values of pixels not included in the set range of signal values are excluded from the 5 pixels×5 pixels including the pixel of interest. If the results of the non-linear function f(v) represented by formula (2) are zero with respect to all of the 5 pixels×5 pixels including the pixel of interest, the smoothing process is not performed, and a constant c is output. In the present embodiment, the constant c is the pixel value of the pixel of interest. If, on the other hand, none of the 5 pixels×5 pixels including the pixel of interest satisfy zero, the smoothing process is executed by calculating the average value of the pixels where the results obtained by the non-linear function f(v) are not zero.

Figure 6:
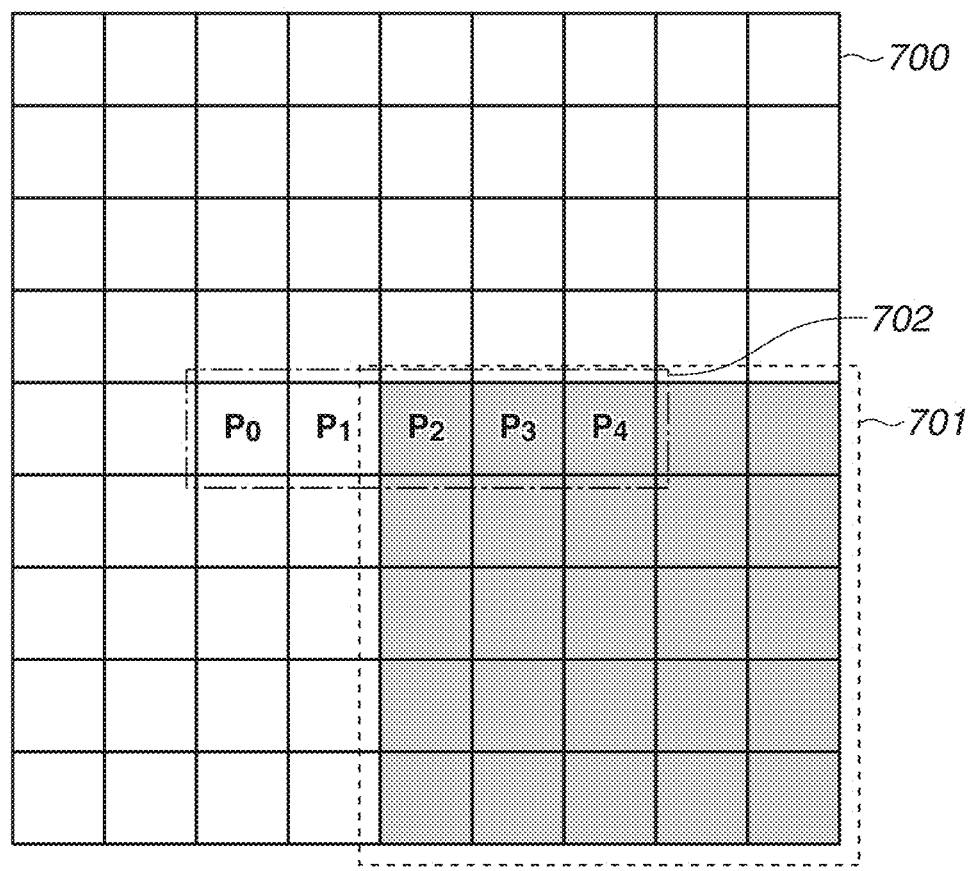
FIG. 6 is an example of an image including a corner portion.

Next, referring to FIG. 6 as an example, the effects of the image processing apparatus according to the present embodiment are described. An image 700 includes 9 pixels×9 pixels, i.e., 81 pixels. For ease of description, the image 700 is an 8-bit gray image in which the pixel value of each pixel is any value from 0 to 255. If the pixel value of a white pixel is 255, and the pixel value of a gray pixel is 128, the image 700 is an image including a corner portion 701 where edges intersect at the lower right end of the image. A description is given below using as a specific example a pixel group 702, which is represented by pixels P0, P1, P2, P3, and P4.

Figure 7A:
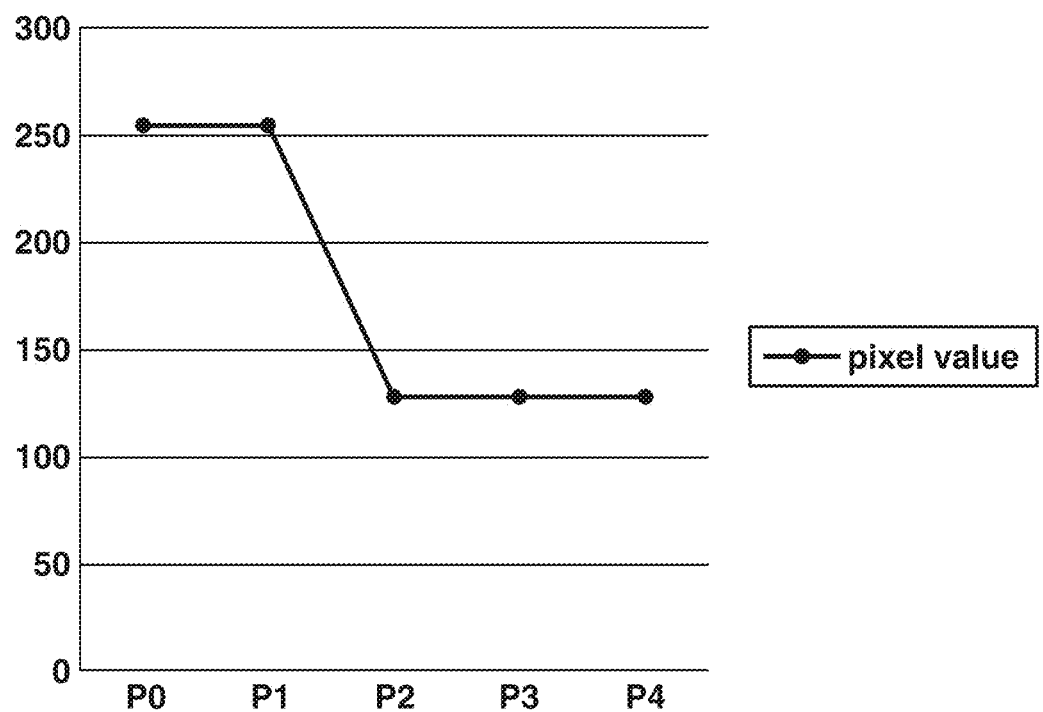
FIGS. 7A and 7B are diagrams illustrating examples of a pixel group.
Figure 7B:
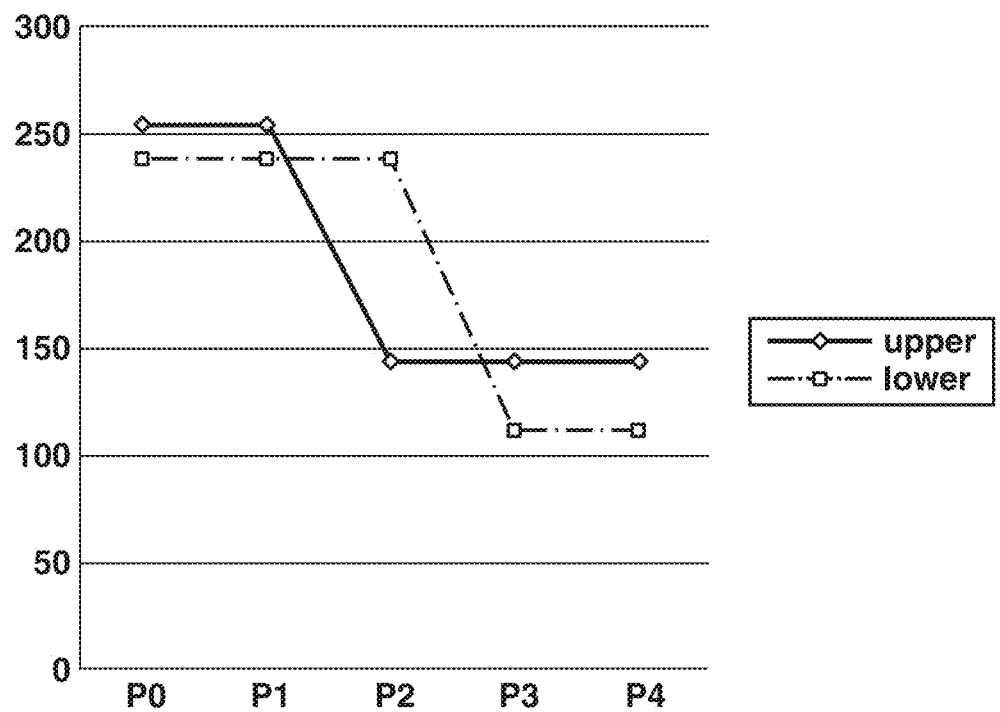

FIGS. 7A and 7B are diagrams illustrating the pixel values of the pixel group 702 and the signal value section determined for each pixel. FIG. 7A is a graph plotting the pixel values obtained by scanning the pixel group 702 in the order of raster scanning. The horizontal axis represents the pixel position, and the vertical axis represents the pixel value. Further, FIG. 7B is a graph plotting the lower limit lower and the upper limit upper output from the signal value section determination unit 201 for each pixel of the pixel group 702. In FIG. 7B, a fixed value of 16 is used as the constant q.

If the pixel of interest in the image is a flat portion, the difference between the maximum value max and the minimum value min of either the first area 300 or the second area 301 is also small. Therefore, with respect to the lower limit lower set by the maximum value max−the median value med, and the upper limit upper set by the minimum value min+the median value med, the signal value section is determined such that the difference between the maximum value max and the minimum value min is increased. If the pixel of interest in the image is an edge, the difference between the maximum value max and the minimum value min of either of the first area 300 or the second area 301 is great. Therefore, with respect to the lower limit lower set by the maximum value max−the median value med, and the upper limit upper set by the minimum value min+the median value med, the signal value section is determined such that the maximum value max and the minimum value min are brought closer to each other and the difference between the maximum value max and the minimum value min becomes smaller than in a case where the pixel of interest is a flat portion. As a result, in a flat portion of the image, the signal value section is larger, and more pixels for smoothing the pixel of interest can be detected than in a case where the pixel of interest is an edge portion. This means that a noise reduction effect is strengthened in the flat portion. On the other hand, in an edge portion of the image, the signal value section is smaller, and only a pixel having a pixel value closer to the pixel of interest is detected. Thus, in the edge portion of the image, the preservation of the edge can be given priority over the noise reduction effect. As described above, in the first embodiment, according to the difference between the maximum value and the minimum value of pixel values in a predetermined area, a signal value section for detecting pixels for use in a smoothing process is set, thereby achieving a noise reduction according to a character of an image.

Further, as illustrated in FIG. 7B, at the pixel P2, which corresponds to the vertex of the corner portion 701, the difference between the maximum value max1 and the minimum value min1 detected in the first area 300 and the difference between the maximum value max2 and the minimum value min2 detected in the second area 301 both have great values. Therefore, at the pixel P2, which corresponds to the vertex of the corner portion 701, the lower limit lower of the set signal value section is greater than the upper limit upper. Thus, there is no pixel satisfying the condition that the pixel value is equal to or greater than the lower limit lower and less than or equal to the upper limit upper. Consequently, the result of the non-linear function f(v) represented by formula (2) is unconditionally zero, which means that the average value is not calculated by the smoothing processing unit 202.

As described above, in the present embodiment, the lower limit is set based on the maximum value of the first area 300 or the second area 301, and the upper limit is set based on the minimum value of the first area 300 or the second area 301. In this case, if the difference between the maximum value and the minimum value is equal to or greater than a predetermined value, the lower limit and the upper limit are reversed. In the first embodiment, if the difference between the maximum value and the minimum value is equal to or greater than two times the median value, the lower limit and the upper limit are reversed. When the upper limit and the lower limit are thus set, by using a signal value section for detecting a pixel having a pixel value close to the pixel value of a pixel of interest without setting a special determination circuit at a previous stage, it becomes possible to substantially determine whether a smoothing process is to be executed. Only if the difference between the maximum value and the minimum value is equal to or greater than the predetermined value, a noise reduction process is executed by smoothing. In the present embodiment, a corner portion is detected as a feature point. Accordingly, the corner portion is detected with high accuracy, and smoothing is not performed, whereby it is possible to detect the feature point with high accuracy at a subsequent stage.

Figure 3A:
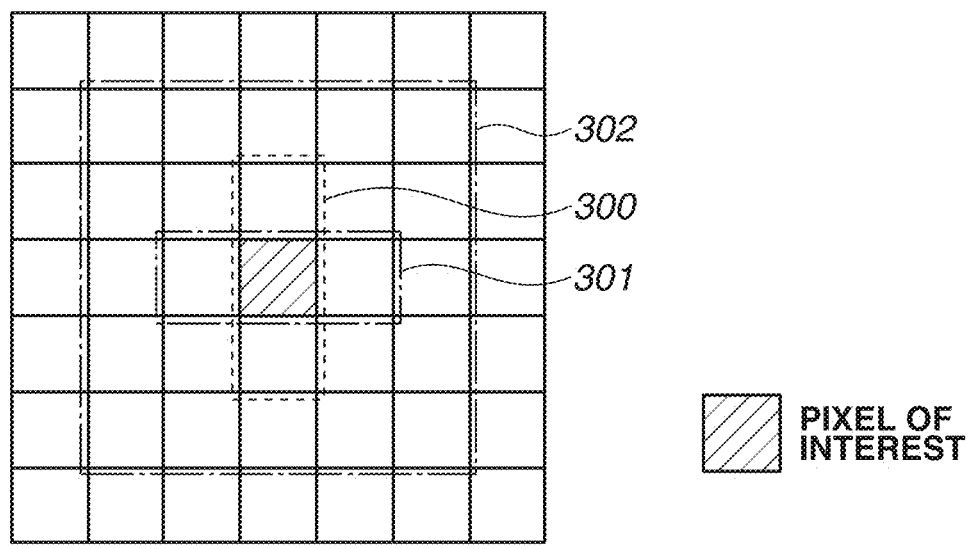
FIGS. 3A and 3B are diagrams illustrating relationships between a pixel of interest and windows.
Figure 3B:
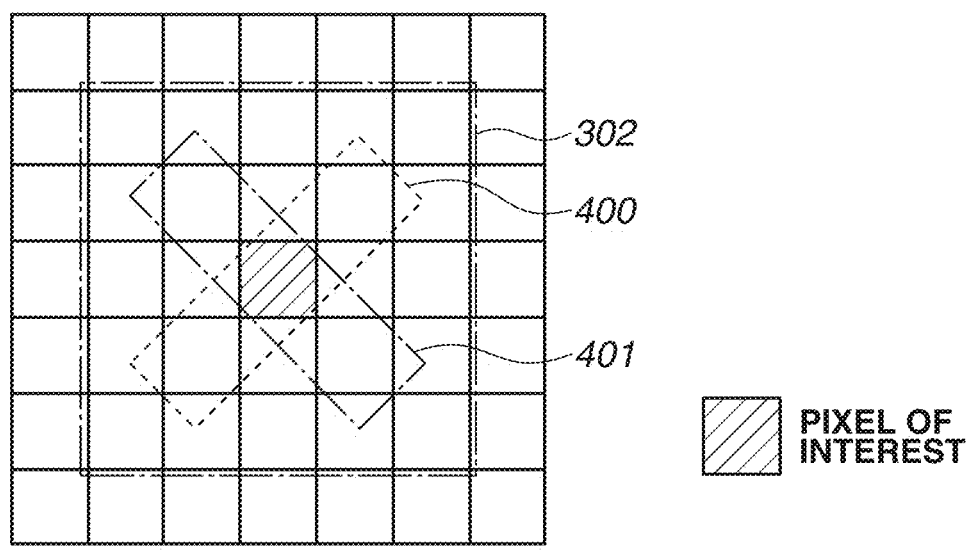

In the above description, as the first area 300 and the second area 301, areas other than an area extending in the vertical direction and an area extending in the horizontal direction with the pixel of interest at the center as illustrated in FIG. 3A may be used. For example, as illustrated in FIG. 3B, a first area 400 may be an area including three pixels from the upper right to the lower left with the pixel of interest at the center. In this case, as a second area 401, an area including three pixels positioned orthogonal to the first area 400 and from the upper left to the lower right with the pixel of interest at the center is selected.

Further, in the present embodiment, the median value med is the constant q for calculating the signal value section. Alternatively, the constant q may be calculated based on a table or a mathematical formula using the median value med, or the constant q may be calculated without using the median value med. The greater the value of the constant q, the wider the signal value section, and the greater the number of pixels for use in smoothing. Thus, the effect of the noise reduction process is strengthened. Further, the smaller the value of the constant q, the smaller the number of pixels for use in smoothing, and the less likely the smoothing process is to be executed. In a case where reduction of blur in an edge portion or preservation of a corner portion is given priority over the effect of the noise reduction process, the constant q may be set to a relatively small value.

Further, a description has been given using as an example a method in which, if there is no pixel having a pixel value in the signal value section, the signal value section determination unit 201 outputs the pixel value of the pixel of interest. For example, the median value med may be the constant c.

Further, the smoothing processing unit 202 may also use formula (3) instead of the calculation of the average value represented by formula (1).

$$O(x, y) = \begin{cases} \dfrac{\Sigma_i \Sigma_j w(i, j) I\binom{x+i,}{y+j} f\left(I\binom{x+i,}{y+j}\right)}{\Sigma_i \Sigma_j w(i, j) f(I(x+i, y+j))}, & \Sigma_i \Sigma_j f\left(I\binom{x+i,}{y+j}\right) > 0 \\ c, & \Sigma_i \Sigma_j f\left(I\binom{x+i,}{y+j}\right) = 0 \end{cases}$$

Formula (3)

In formula (3), w(i, j) is a weight coefficient and can optionally specify the value of a weight for each pixel in the window 302. Alternatively, the smoothing processing unit 202 may mix the average value calculated by formula (1) with the pixel value of the pixel of interest using any optional ratio and outputs the resulting value.

Figure 8:
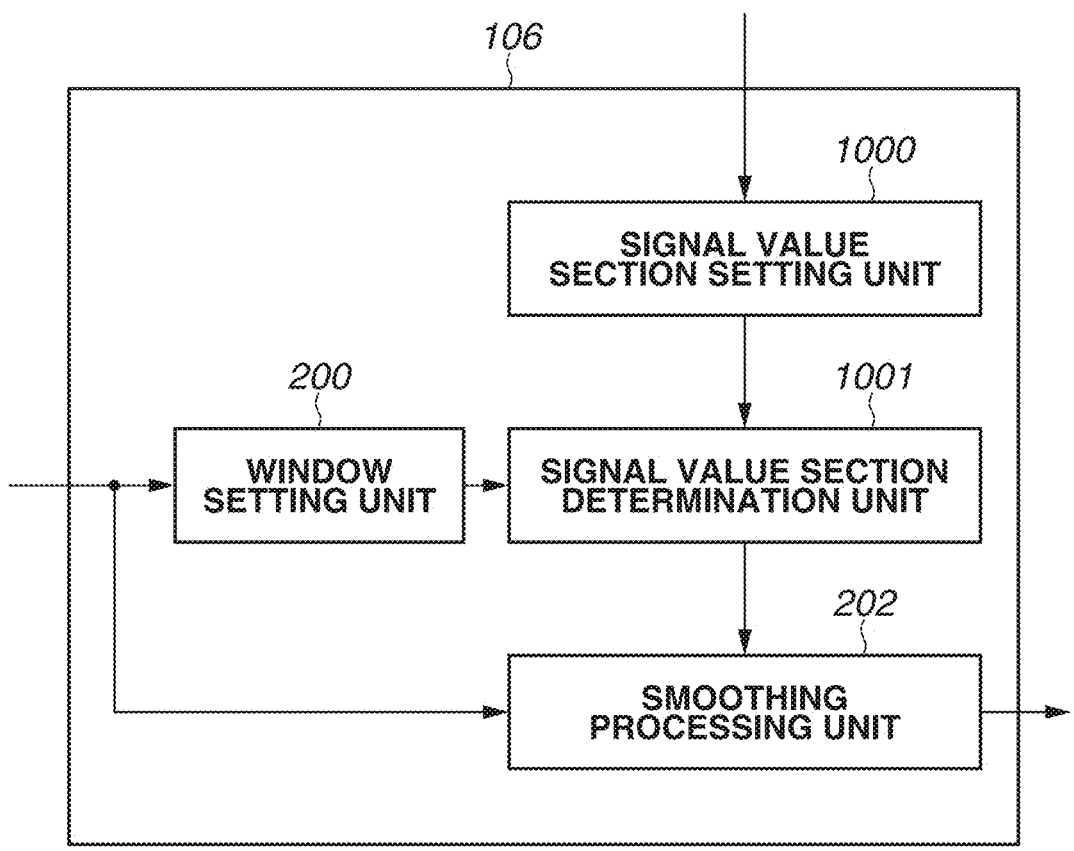
FIG. 8 is a block diagram illustrating a configuration of a noise reduction processing unit.

A second embodiment will be described below. As a block diagram illustrating an image processing apparatus according to the second embodiment, FIG. 1 in the first embodiment is used in common. FIG. 8 is a block diagram illustrating the configuration of the noise reduction processing unit 106 according to the second embodiment. Components having functions similar to the first embodiment are designated by the same signs, and are not described in detail. The noise reduction processing unit 106 includes a signal value section setting unit 1000, which sets a signal value section for a signal value section determination unit 1001.

Figure 9:
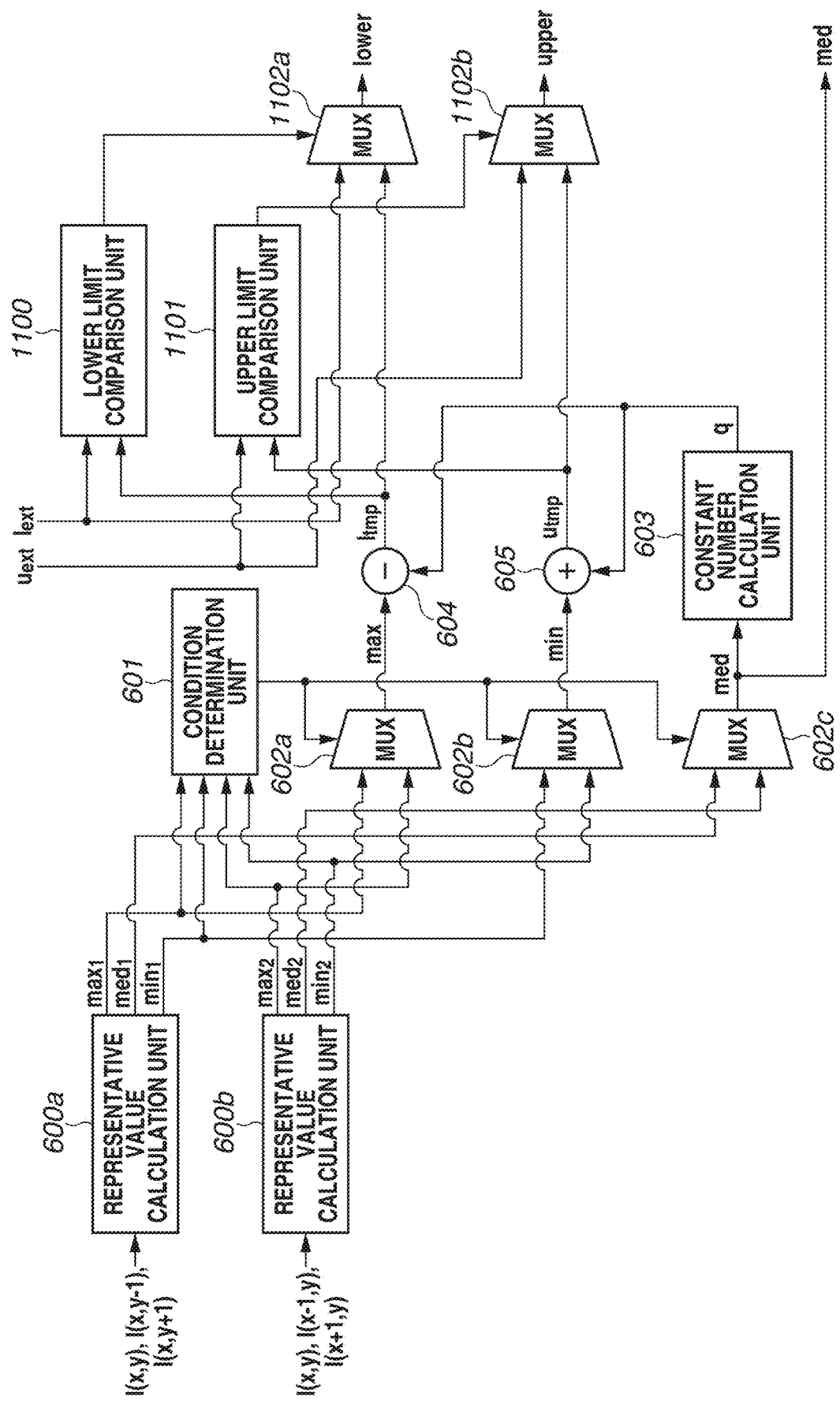
FIG. 9 is a block diagram illustrating an internal configuration of a signal value section determination unit.

For the signal value section determination unit 1001, the signal value section setting unit 1000 sets an upper limit and a lower limit of a signal value determined in advance or an upper limit and a lower limit of a signal value notified from outside. FIG. 9 is a block diagram illustrating the internal configuration of the signal value section determination unit 1001 according to the present embodiment. Components having functions similar to those of the first embodiment are designated by the same signs, and are not described in detail.

The signal value section determination unit 1001 additionally includes a lower limit comparison unit 1100, an upper limit comparison unit 1101, and multiplexers 1102a and 1102b. The lower limit comparison unit 1100 compares a lower limit lext, which is set by the signal value section setting unit 1000, with a lower limit ltmp, which is output from the subtraction unit 604. Then, the lower limit comparison unit 1100 outputs a control signal to the multiplexer 1102a such that the greater of the lower limits is selected. The upper limit comparison unit 1101 compares an upper limit uext, which is set by the signal value section setting unit 1000, with an upper limit utmp, which is output from the addition unit 605. Then, the lower limit comparison unit 1100 outputs a control signal to the multiplexer 1102b such that the smaller of the upper limit values is selected.

Figure 10:
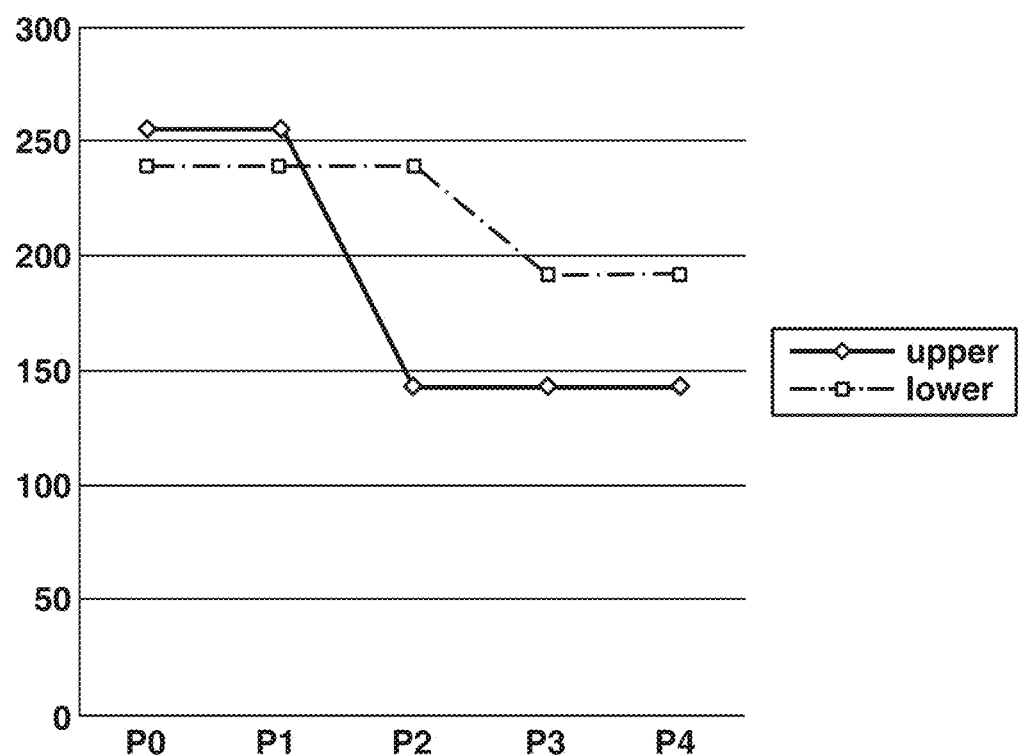
FIG. 10 is a diagram illustrating an example of a pixel group.

Next, using FIG. 10 as an example, the effects of the image processing apparatus according to the present embodiment are described. FIG. 10 is a graph plotting the lower limit lower and the upper limit upper output from the signal value section determination unit 1001 for the pixel group 702 in FIG. 6. In FIG. 10, the constant q is a fixed value of 16, and the lower limit lext and the upper limit uext, which are set by the signal value section setting unit 1000, are 192 and 255, respectively. As illustrated in FIG. 10, the lower limit lower and the upper limit upper of the signal value section are reversed at the pixels P2, P3, and P4 of the corner portion 701. In the configuration of the present embodiment, it is thus possible to prevent the smoothing of pixels belonging to a dark portion in the image in addition to the vertex of the corner portion 701.

Further, in addition to the example illustrated in FIG. 10, for example, if the lower limit lext and the upper limit uext, which are set by the signal value section setting unit 1000, are 0 and 225, respectively, it is possible to prevent the smoothing of pixels belonging to a high-luminance portion in the image in FIG. 10.

As described above, according to the present embodiment, the signal value section setting unit 1000 is provided so that it is possible to adjust the range of pixel values where the smoothing processing unit 202 performs smoothing.

Other Embodiments

The above embodiments have been described using as an example a case where the present disclosure can be achieved by a circuit (e.g., an application-specific integrated circuit (ASIC)) for achieving one or more functions. The present disclosure, however, can also be achieved by the process of supplying a program for achieving one or more functions of the above embodiments to a system or an apparatus via a network or a storage medium, and causing one or more processors of a computer of the system or the apparatus to read and execute the program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-166097, filed Aug. 30, 2017, which is hereby incorporated by reference herein in its entirety.

What is claimed is:

1. An image processing apparatus to execute a noise reduction process on an image, the image processing apparatus comprising: at least one processor and at least one memory coupled to each other and to perform operations including:

setting a first area including a pixel of interest and pixels adjacent to the pixel of interest, setting a second area including the pixel of interest and pixels adjacent to the pixel of interest, wherein the second area is different from the first area, detecting a first value and a second value among pixel values of the adjacent pixels included in the first area, wherein the first value is higher than the second value, detecting a third value and a fourth value among pixel values of pixels included in the second area, wherein the third value is higher than the fourth value, comparing, to obtain a smaller difference, a difference between the first value and the second value with a difference between the third value and the fourth value, setting a signal value section based on values showing the smaller difference, calculating a calculated lower limit of the set signal value section by subtracting a predetermined value from the first value, calculating a calculated upper limit of the set signal value section by adding the predetermined value to the second value, and calculating a pixel value of the pixel of interest subjected to the noise reduction process based on averaging pixel values of a plurality of pixels set according to the set signal value section, the calculated lower limit, and the calculated upper limit.

2. The image processing apparatus according to claim 1, wherein, in a case where the difference between the first value and the second value is less than the predetermined value, calculating includes calculating a weighted average obtained by using pixels and assuming pixel values included in the set signal value section at, and adjacent to, the pixel of interest, and wherein, in a case where the difference between the first value and the second value is equal to or greater than the predetermined value, calculating includes not calculating the weighted average.

3. The image processing apparatus according to claim 2, wherein, in the case where the difference between the first value and the second value is equal to or greater than the predetermined value, calculating includes outputting the calculated pixel value of the pixel of interest subjected to the noise reduction process.

4. The image processing apparatus according to claim 1, wherein setting includes setting a set lower limit of the set signal value section based on the first value and setting a set upper limit of the set signal value section based on the second value.

5. The image processing apparatus according to claim 1, wherein calculating includes outputting, as the calculated pixel value of the pixel of interest subjected to the noise reduction process, an averaged value obtained by using pixels and assuming pixel values within the set signal value section.

6. The image processing apparatus according to claim 1, wherein setting includes:

receiving a signal indicating a received upper limit and a received lower limit from outside, comparing the received lower limit value and a value obtained by subtracting the predetermined value from the first value, and selecting the greater of the two values as a lower limit of the set signal value section, and comparing the received upper limit value with a value obtained by adding the predetermined value to the second value, and selecting the smaller of the two values as an upper limit of the set signal value section.

7. The image processing apparatus according to claim 1, wherein the predetermined value is calculated based on pixel values of a pixel group in the first area.

8. The image processing apparatus according to claim 7, wherein setting includes calculating a median of the pixel values of the pixel group in the first area as the predetermined value.

9. The image processing apparatus according to claim 1, wherein the first area is a pixel group in a vertical direction with the pixel of interest at a center of the first area, and the second area is a pixel group in a horizontal direction with the pixel of interest at a center of the second area.

10. The image processing apparatus according to claim 1, wherein, in a case where the pixel of interest is a pixel included in an edge of the image, calculating the pixel value of the pixel of interest subjected to the noise reduction process includes averaging a plurality of pixels.

11. The image processing apparatus according to claim 10,
wherein, in the case where the pixel of interest is the pixel included in the edge of the image, the signal value section is a first signal value section, and
wherein, in a case where the pixel of interest is a pixel included in a flat portion of the image, setting includes making a signal value section larger than the first signal value section.

12. A method for an image processing apparatus to execute a noise reduction process on an image, the method comprising:
setting a first area including a pixel of interest and pixels adjacent to the pixel of interest;
setting a second area including the pixel of interest and pixels adjacent to the pixel of interest, wherein the second area is different from the first area;
detecting a first value and a second value among pixel values of the adjacent pixels included in the first area, wherein the first value is higher than the second value;
detecting a third value and a fourth value among pixel values of pixels included in the second area, wherein the third value is higher than the fourth value;
comparing, to obtain a smaller difference, a difference between the first value and the second value with a difference between the third value and the fourth value;
setting a signal value section based on values showing the smaller difference;
calculating a calculated lower limit of the set signal value section by subtracting a predetermined value from the first value;
calculating a calculated upper limit of the set signal value section by adding the predetermined value to the second value; and
calculating a pixel value of the pixel of interest subjected to the noise reduction process based on averaging pixel values of a plurality of pixels set according to the set signal value section, the calculated lower limit, and the calculated upper limit.

13. The method according to claim 12, wherein setting includes setting a signal value section based on the first value and the second value.

14. The method according to claim 13, wherein calculating includes averaging pixel values of a plurality of pixels set according to the set signal value section.

15. A non-transitory computer-readable storage medium storing a program to cause a computer to perform a method for an image processing apparatus to execute a noise reduction process on an image, the method comprising:
setting a first area including a pixel of interest and pixels adjacent to the pixel of interest;
setting a second area including the pixel of interest and pixels adjacent to the pixel of interest, wherein the second area is different from the first area;
detecting a first value and a second value among pixel values of the adjacent pixels included in the first area, wherein the first value is higher than the second value;
detecting a third value and a fourth value among pixel values of pixels included in the second area, wherein the third value is higher than the fourth value;
comparing, to obtain a smaller difference, a difference between the first value and the second value with a difference between the third value and the fourth value;
setting a signal value section based on values showing the smaller difference;
calculating a calculated lower limit of the set signal value section by subtracting a predetermined value from the first value;
calculating a calculated upper limit of the set signal value section by adding the predetermined value to the second value; and
calculating a pixel value of the pixel of interest subjected to the noise reduction process based on averaging pixel values of a plurality of pixels set according to the set signal value section, the calculated lower limit, and the calculated upper limit.

* * * * *